Oct. 11, 1938.            C. H. MORROW            2,132,749
VALVE RESETTING DEVICE
Filed Oct. 9, 1936

INVENTOR
CLARENCE H. MORROW
BY
ATTORNEYS

Patented Oct. 11, 1938

2,132,749

UNITED STATES PATENT OFFICE 2,132,749

VALVE RESETTING DEVICE

Clarence H. Morrow, Shaker Heights, Ohio, assignor to The Hotstream Heater Company, Cleveland, Ohio, a corporation of Ohio Application October 9, 1936, Serial No. 104,806

3 Claims. (Cl. 251—137)

This invention relates to a valve resetting device. The invention has to do with valve devices for controlling the supply of fuel to a burner and more particularly to emergency valves which are manually set or adjusted to open position and are there held by trigger mechanism tripped upon occurrence of emergency conditions so that the valve moves to closed position where it remains until reset by hand.

One object of the invention is to provide a valve device of this kind which is fully packed against leakage of gas to the outside air but is nevertheless capable of operation from the exterior of the valve casing and without opening the same. A further object is to provide valve mechanism which is highly sensitive in operation but is nevertheless free from leakage of gas. A further object of the invention is to provide valve mechanism of this kind including two springs or spring devices, one a light spring for returning the valve to closed position and the other a heavy spring for returning the resetting device to normal position against the friction of the packing therefor.

Further objects of the invention are in part obvious and in part will appear more in detail hereinafter.

Figure 1:
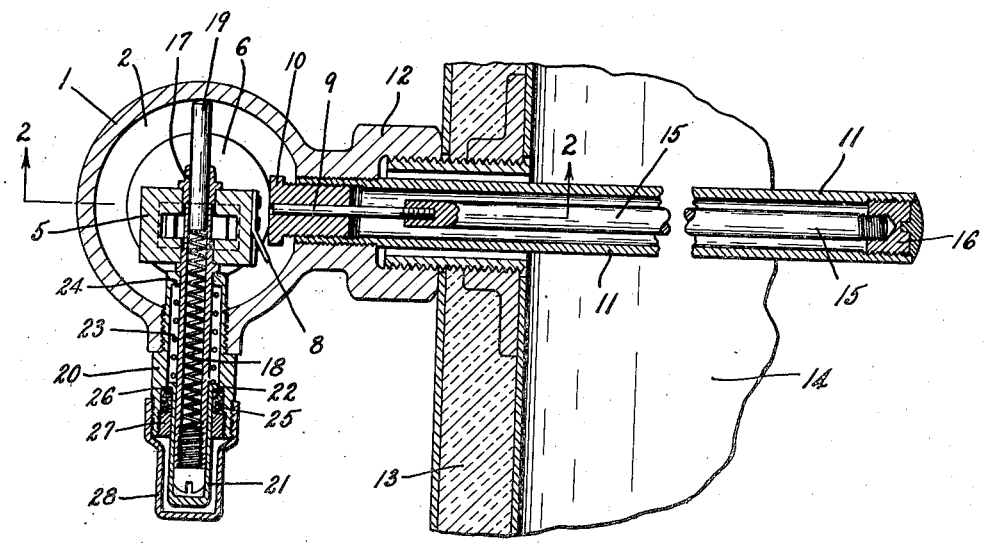
Figure 2:
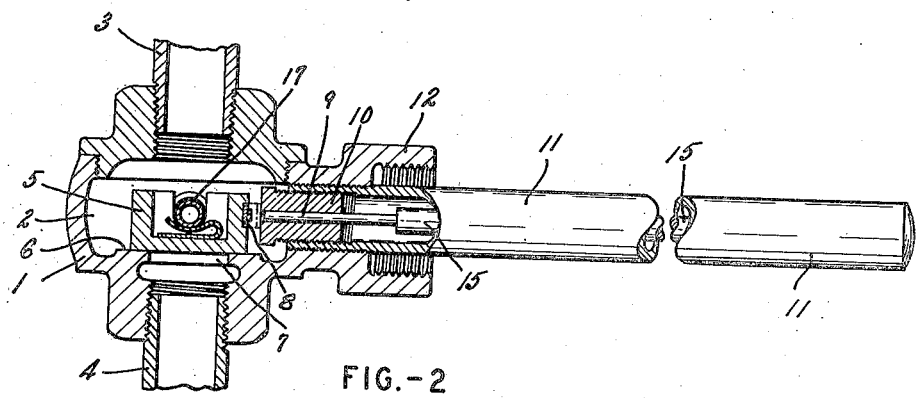
Figure 3:
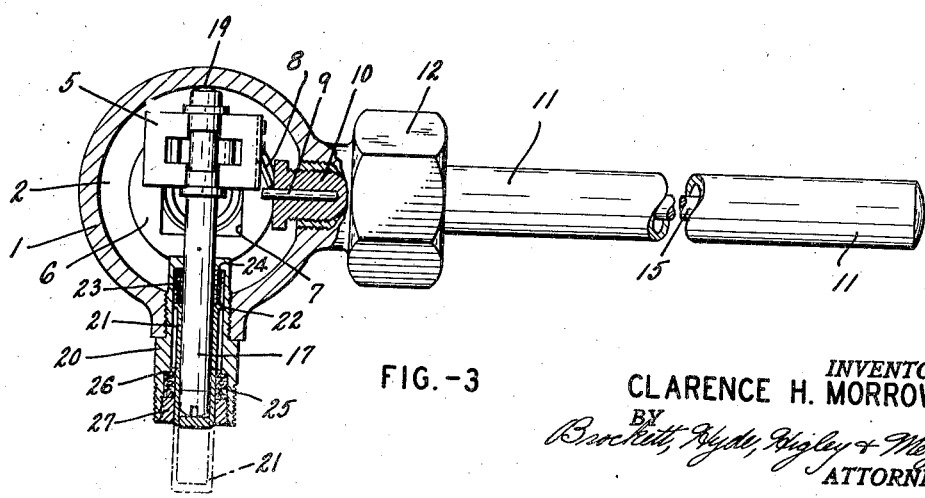

In the drawing, which represents one suitable embodiment of the invention, Fig. 1 is a sectional plan view, showing the valve in closed position; Fig. 2 is a sectional elevation on the line 2—2, Fig. 1; and Fig. 3 is a sectional plan view, corresponding to Fig. 1 and showing the valve in open position, the dotted lines indicating the resetting device in its normal retracted position, and a cap being omitted.

The invention is suitable for use in connection with any emergency valve set or adjusted manually to open position and sensitive to emergency conditions for closing it. It is applicable, for example, to the form of valve mechanism shown in my copending application for Thermostatic device, filed October 1, 1936, Ser. No. 103,478, to which reference may be had for a more complete description if desirable or necessary. In the valve mechanism of this prior application the valve is sensitive to or affected by reduction of temperature. In other words, in the specific form shown in the application the valve is sensitive to the temperature of the pilot flame and when the flame goes out and the thermostatic elements cool the valve moves to closed position. Similar valve mechanism is shown in my prior Patent No. 1,991,863, granted February 19, 1935, where the valve is sensitive to rise in temperature. In other words, the valve mechanism here is sensitive to the temperature of water to be heated and when said temperature rises to or above a maximum value the valve mechanism is operated to cause it to move to closed position. These are but instances of possible ways of controlling the valve mechanism, which might even be operated or controlled manually or mechanically. For convenience, and in no sense of limitation, the invention is shown applied to valve mechanism of the kind illustrated in my prior Patent No. 1,991,863 before referred to.

In the drawing, 1 represents the valve body or casing provided with a valve chamber 2 communicating with supply and discharge pipes 3, 4. In said chamber is a valve member 5 which may be of any suitable type, such as the poppet type shown in my prior patent for Thermostatic gas valve, No. 2,023,640, granted December 10, 1935, but which is shown as a sliding member moving along the valve seat 6 and controlling the flow of gas from the supply pipe to the discharge pipe by way of the port 7. Valve member 5 is provided at one side with a spring finger 8 adapted to cooperate with a suitable trigger device, such as the end of a trigger rod 9 sliding in an opening in an adjustable plug 10 fitted within a tube 11 which may be made of expansible material, such as copper, brass or the like and is mounted in an extension 12 of the valve casing suitably connected to the wall 13 of the water tank having a water space 14.

Expansible member 11 cooperates with a relatively non-expansible member 15 made of steel, iron or the like, and to which the trigger pin 9 is connected. The outer end of member 15 is threaded in a plug 16 fastened within the end of the tube 11.

With this arrangement, when the water is cold or below the maximum temperature for which the parts are adjusted, the end of the trigger 9 projects outwardly from plug 10 into the valve chamber, as shown in Fig. 3, into such position as to form an abutment for finger 8 to hold the valve in open position. When the water temperature reaches the maximum and emergency conditions thereby arise, the tube 11 expands, moves pin 9 to the right and releases the finger 8, so that the valve can move to closed position.

As described in my heretofore referred to Patent No. 1,991,863, the valve member 5 is connected to a tubular member 17 within which is a light compression spring 18 abutting the closed end of the tube 17 at one end and at its opposite end engaging a pin 19 whose free end engages the casing wall. This tube slides within a sleeve 20 threaded into the casing. To set or adjust the valve to open position, the tube is pushed in or moved upwardly in Fig. 1 until the parts reach the position shown in full lines Fig. 3, with finger 8 latched by the trigger pin 9.

To prevent leakage of gas to the outside of the valve casing I provide suitable packing means completely surrounding, covering, and enclosing the movable tube 17 but nevertheless admitting of operation thereof. These parts include a tubular cap 21 sleeved upon the tube 17 but internally slightly larger than tube 17, so that the two tubes 17, 21 slide freely relatively to each other and without friction between them. The outer end of tube 21 is closed and its inner end is provided with an outwardly extending flange 22 forming an abutment for one end of a strong compression spring 23 held within an annular chamber between tubes 17 and 20 and at its opposite end abutting a shoulder 24. 25 represents a packing made of any suitable compressible material and abutting a washer 26 and adjusted by the gland nut 27. The spring 18 is a light spring whose only function is to return the valve to its closed position when the trigger is operated. This spring is purposely made light so as to reduce to a minimum the pressure of the finger 8 upon the trigger and enable the trigger to be readily and freely moved by its operating device, whether it be manual, thermostatic, mechanical or otherwise. The spring 23, however, is a considerably stronger spring, its function being to return the tube 21 to its normal position when it has been pushed in to set the valve device. This spring must be stronger because it must overcome the friction of the packing 25.

With this arrangement the tube 21 may be left wholly exposed to the atmosphere and ready for actuation by the fingers at any time, as shown in Fig. 3. Assuming the valve closed and that it is desired to open the valve, the tube 21 is pushed in and carries with it the inner tube 17 and the valve 5. The parts are pushed in until the valve is latched by the trigger, whereupon the finger is taken off. Tube 21 is returned to its normal position by spring 23, but the tube 17 and the valve parts remain in their "on" position. When the trigger is operated the valve closes, but it may be readily reset by hand as described.

If desired, the exposed part of the tube 21 may be normally covered or enclosed in any suitable manner, such as by a cap 28 threaded upon the exterior of the member 20. This cap is used, for example, in apartment houses where a number of these thermostatic devices are attached to gas operated devices of various tenants and the janitor, who services all of the devices, desires to make it difficult for individual tenants to manipulate their valves. In such cases the janitor can remove the cap 28 and reset the valve device and even if he loses the cap or omits to replace it, no leakage can occur.

What I claim is:

1. In gas valve mechanism, a chambered casing, a valve member mounted therein for movement between open and closed positions, a tubular member associated with said valve member and adapted when operated to move said valve member to one of said positions, a spring arranged within said tubular member and normally urging said valve member to the other of said positions, a tubular device slidably mounted in the wall of said casing and having a closed outer end portion projecting therefrom for manual actuation, the outer end portion of said tubular member lying within said tubular device so that the manual actuation of said device effects operation of said tubular member, and gas-sealing packing means arranged between said tubular device and said casing wall.

2. In gas valve mechanism, a chambered casing, a valve member slidably mounted therein for movement between open and closed positions, a tubular member connected with said valve member and adapted when operated to move said valve member to open position, a spring arranged within said tubular member and normally urging said valve member to move to closed position, a tubular device slidably mounted in the wall of said casing and having its outer end closed and projecting from said casing for manual advancing movement, the outer end portion of said tubular member lying within said tubular device so that advancing movement of said device effects operation of said tubular member, said device having its inner end open and laterally flanged, a coiled spring surrounding said tubular member and having its ends engaging said casing wall and the flanged inner end of said tubular device and normally urging said tubular device to move to its retracted position, and gas-sealing packing means arranged between said tubular device and said casing wall.

3. In gas valve mechanism, a chambered casing, a valve member mounted therein for movement between open and closed positions, operable means associated with said valve member and adapted when operated to move said valve member to one of said positions, resilient means normally urging said valve member to the other of said positions, a chambered device slidably mounted in said casing and having a closed portion projecting therefrom for manual actuation, a portion of said operable means lying within the chamber of said device so that the manual actuation thereof effects operation of said operable means, resilient means normally urging said chambered device to non-actuated position, and gas-sealing packing means arranged between said chambered device and said casing.

CLARENCE H. MORROW.